United States Patent
Ishigami et al.

(10) Patent No.: US 8,785,806 B2
(45) Date of Patent: Jul. 22, 2014

(54) SUBMERGED ARC WELDING METHOD WITH MULTIPLE ELECTRODES FOR STEEL MATERIAL

(75) Inventors: Atsushi Ishigami, Chiba (JP); Kenji Oi, Tokyo (JP); Naoya Hayakawa, Chiba (JP)

(73) Assignee: JFE Steel Corporation (JP)

( * ) Notice: Subject to any disclaimer, the term of this patent is extended or adjusted under 35 U.S.C. 154(b) by 569 days.

(21) Appl. No.: 12/918,095

(22) PCT Filed: Feb. 19, 2009

(86) PCT No.: PCT/JP2009/053472
§ 371 (c)(1),
(2), (4) Date: Nov. 2, 2010

(87) PCT Pub. No.: WO2009/104806
PCT Pub. Date: Aug. 27, 2009

(65) Prior Publication Data
US 2011/0036814 A1    Feb. 17, 2011

(30) Foreign Application Priority Data

Feb. 22, 2008  (JP) ................................. 2008-040842
Mar. 4, 2008   (JP) ................................. 2008-053327

(51) Int. Cl.
*B23K 9/18*    (2006.01)
*B23K 9/025*   (2006.01)
*B23K 9/028*   (2006.01)

(52) U.S. Cl.
CPC ............. *B23K 9/188* (2013.01); *B23K 9/0253* (2013.01); *B23K 9/0282* (2013.01); *B23K 2203/04* (2013.01)
USPC ............................................................. 219/73

(58) Field of Classification Search
CPC ..... B23K 9/0253; B23K 9/0282; B23K 9/188
USPC .................... 219/73, 73.1, 73.11, 73.2, 73.21
See application file for complete search history.

(56) References Cited

FOREIGN PATENT DOCUMENTS

| JP | 52-082652 A |   | 7/1977 |
| JP | 58-032583 A |   | 2/1983 |
| JP | 62040977 A | * | 2/1987 |
| JP | 10-109171 A |   | 4/1998 |
| JP | 11-138266 A |   | 5/1999 |
| JP | 2006-272377 A |   | 10/2006 |
| JP | 2006272377 A | * | 10/2006 |
| JP | 2007-260684 A |   | 10/2007 |
| JP | 2007-268564 A |   | 10/2007 |
| JP | 2007260684 A | * | 10/2007 |
| JP | 2007268564 A | * | 10/2007 |

* cited by examiner

*Primary Examiner* — Henry Yuen
*Assistant Examiner* — John J Norton
(74) *Attorney, Agent, or Firm* — DLA Piper LLP (US)

(57) ABSTRACT

Steel is subjected to multiple-electrode submerged arc welding with three or more electrodes in which a direct-current power source is used to supply current to a first electrode, the welding by the first electrode is carried out at a current density of 250 A/mm² or more, preferably with a wire diameter of 3.2 mm or less and a weld current of 1,000 A or more, the welding by the second electrode is carried out at a current density of 150 A/mm² or more, preferably with a weld current of 600 A or more, one of the interelectrode spacings is 23 mm or more on a surface of the steel, and the remaining interelectrode spacings are 20 mm or less.

15 Claims, 7 Drawing Sheets

SUBMERGED ARC WELDING METHOD WITH MULTIPLE ELECTRODES FOR STEEL MATERIAL

RELATED APPLICATIONS

This is a §371 of International Application No. PCT/JP2009/053472, with an international filing date of Feb. 19, 2009 (WO 2009/104806 A1, published Aug. 27, 2009), which is based on Japanese Patent Application Nos. 2008-040842, filed Feb. 22, 2008, and 2008-053327, filed Mar. 4, 2008, the subject matter of which is incorporated by reference.

TECHNICAL FIELD

This disclosure relates to multiple-electrode submerged arc welding methods for steel, and particularly to a multiple-electrode submerged arc welding method suitable for welding in the manufacture of large-diameter steel pipes, such as UOE steel pipes or spiral steel pipes, formed of base materials ranging in thickness from 10 to 50 mm.

BACKGROUND

For seam welding of large-diameter steel pipes, double one-layer welding is commonly employed in which the inner side is welded in one pass and then the outer side is welded in one pass by multiple-electrode submerged arc welding with three or more electrodes. FIG. 3 shows the cross-sectional shape of a double one-layer weld.

That is, submerged arc welding with two or more electrodes is applied to welding (seam welding) in the manufacture of large-diameter steel pipes, and double one-layer welding in which the inner side is welded in one pass and then the outer side is welded in one pass is employed as a highly efficient welding procedure for improved production efficiency of steel pipes (for example, Japanese Unexamined Patent Application Publication Nos. 11-138266 and 10-109171).

Although double one-layer welding is a highly efficient welding procedure, a sufficient depth of fusion must be ensured to allow an inner weld metal 4B and an outer weld metal 4A to overlap each other so that no unmelted part remains and, accordingly, it is generally carried out by applying a large current of 1,000 A or more.

However, if the heat input is increased in view of welding efficiency and inhibiting welding defects, the structure of a welded heat-affected zone becomes coarse, thus degrading weld toughness, whereas if the heat input is reduced, welding defects such as slag inclusions 13 are increased. Accordingly, some seam welding methods for large-diameter steel pipes have been proposed that are superior in preventing welding defects at low heat input.

That is, although a reduction in weld heat input is effective in increasing weld toughness, the effect of increasing toughness does not appear clearly unless the heat input is significantly reduced relative to the heat input of common seam welding, whereas a significant reduction in heat input decreases the amount of deposit metal, and the cross-sectional area of grooves must be reduced correspondingly. Therefore, without deep penetration welding, the inner weld metal and the outer weld metal do not overlap each other, thus posing the risk of a lack of penetration.

Accordingly, an increase in weld toughness requires both a significant reduction in heat input and an increase in depth of fusion, and this is extremely difficult to achieve despite various proposals that have so far been made.

As a multiple-electrode submerged arc welding method, Japanese Unexamined Patent Application Publication No. 52-82652 discloses a method for achieving a sufficient depth of fusion and a good bead shape by adjusting the bead shape using a thick wire as the last electrode while ensuring a sufficient depth of fusion using a direct-current power source for the leading electrode and using a thin wire for increased current density.

Although the method disclosed in Japanese Unexamined Patent Application Publication No. 52-82652 provides a sufficient depth of fusion and a good bead surface shape, it has been pointed out that slag does not rise sufficiently from the bottom of weld metal melted deeply by the leading electrode and may therefore remain as defects.

In addition, as a method for welding in the manufacture of large-diameter steel pipes, Japanese Unexamined Patent Application Publication No. 58-32583 discloses a method for forming a welded joint with superior weld properties while inhibiting defects and ensuring a good bead shape by subjecting the inner side to multiple-electrode submerged arc welding at low heat input and subjecting the outer side to multilayer welding by gas metal arc welding and submerged arc welding.

The welding method disclosed in Japanese Unexamined Patent Application Publication No. 58-32583, however, has extremely low efficiency and is therefore difficult to apply to actual operation because it requires low-heat-input welding for inner welding and two-layer welding for outer welding.

In addition, Japanese Unexamined Patent Application Publication No. 10-109171 mentioned above proposes a submerged arc welding method in which the depth of fusion is increased by increasing the current densities of electrodes depending on the diameters thereof, although the currents and current densities thereof are insufficient for welding of steel pipes, and it is therefore difficult to achieve both a significant reduction in heat input and an increase in depth of fusion.

In addition, Japanese Unexamined Patent Application Publication No. 2006-272377 proposes a high-current, high-current-density submerged arc welding method in which as much arc energy as possible is supplied in the thickness direction to ensure the necessary depth of fusion while inhibiting the base material from being molten in the steel width direction to avoid excessive weld heat input, thereby achieving both a reduction in heat input and deep penetration.

The technique disclosed in Japanese Unexamined Patent Application Publication No. 2006-272377, however, tends to cause welding defects such as slag inclusions in welding of steel plates having a certain thickness or more because liquid slag does not rise easily.

As described above, a practicable seam welding method for large-diameter steel pipes that is superior in preventing welding defects at low heat input has not been satisfactorily completed, and high-current, high-heat-input seam welding is currently carried out to efficiently form a defect-free, sound weld in actual operation.

As a result, ensuring good toughness in the weld metal and a welded heat-affected zone has increasingly been difficult with the recent increase in the strength of line pipes, including commercialization of API X120 line pipes.

Accordingly, in light of the above problems, it could be helpful to provide a multiple-electrode submerged arc welding method for steel that allows a reduction in weld heat input while ensuring penetration comparable to a conventional level and also inhibits welding defects.

It could also be helpful to provide a multiple-electrode submerged arc welding method for steel plates that causes few welding defects, such as slag inclusions, at low heat input.

We have already demonstrated that the use of thin wires for increased current and current density (=current/cross-sectional area of wire) is effective for achieving a sufficient depth of fusion at a weld in multiple-electrode submerged arc welding with three or more electrodes (for example, Japanese Unexamined Patent Application Publication No. 2006-272377). This is because an arc concentrated as a result of increased current and current density exerts a larger gouging force on the base material, and this effect is maximized particularly when the current and current density of the leading first and second electrodes are equal to or more than predetermined levels.

Although the increased current and current density provide deep penetration, the penetration is so deep that slag produced by a slag-metal reaction occurring in the weld metal tends to rise insufficiently, thus raising the incidence rate of welding defects.

SUMMARY

A multiple-electrode submerged arc welding method for steel wherein steel is subjected to multiple-electrode submerged arc welding with three or more electrodes in which a direct-current power source is used to supply current to a first electrode, the current density of the first electrode is 250 A/mm$^2$ or more, the current density of a second electrode is 150 A/mm$^2$ or more, one of the interelectrode spacings (center-to-center spacings between adjacent wires) is 23 mm or more on a surface of the steel, and the remaining interelectrode spacings are 20 mm or less.

The multiple-electrode submerged arc welding method for steel according to item 1, wherein the current of the first electrode is 1,000 A or more, and the current of the second electrode is 600 A or more.

The multiple-electrode submerged arc welding method for steel according to items 1 or 2, wherein the welding by the first electrode is carried out with a wire diameter of 3.2 mm or less.

The multiple-electrode submerged arc welding method for a steel plate according to any of items 1 to 3, wherein the wire center-to-center spacing between the first electrode and the third electrode is 40 to 60 mm on the surface of the steel, and the current ratio of the first electrode ($I_1$) to the second electrode ($I_2$) satisfies the following inequality:

$$I_2/I_1 \geq 0.5$$

where $I_1$ is the current (A) of the first electrode and $I_2$ is the current (A) of the second electrode.

The multiple-electrode submerged arc welding method for a steel plate according to any of items 1 to 4, wherein four electrodes are used in the multiple-electrode submerged arc welding method, and the wire center-to-center spacing between the third electrode and the fourth electrode is 20 mm or less on the surface of the steel.

A multiple-electrode submerged arc welding method for steel wherein each of inner and outer surfaces of steel is subjected to one-layer welding by the multiple-electrode submerged arc welding according to one of items 1 to 5.

A multiple-electrode submerged arc welding method is provided that allows a reduction in weld heat input while ensuring penetration comparable to a conventional level and also inhibits welding defects, so that it has significant industrial usefulness in manufacturing, with high productivity, high-strength steel pipes of API (American Petroleum Institute) X100 or higher with superior seam weld toughness. This method can also be applied to steel pipes other than API X100 steel pipes.

Additionally, the multiple-electrode submerged arc welding method inhibits welding defects such as molten slag inclusions at low heat input without decreasing welding efficiency, so that it has significant industrial usefulness in manufacturing large-diameter welded steel pipes having sound weld beads with superior weld toughness.

REFERENCE NUMERALS

1: UOE steel pipe; 2: specimen; 3: notch location; 4: weld; 4A: outer weld; 4B: inner weld; 5: BOND; 6: first electrode; 7: second electrode; 8: third electrode; 9: fourth electrode; 10: arc; 11: molten pool; 12: molten slag; 13: slag inclusion; 14:

weld metal; 15: direction of travel in welding; t: pipe thickness; 16: inner surface; 17: outer surface; α: angle of electrode; 18: disturbed flow

DETAILED DESCRIPTION

Figure 4:
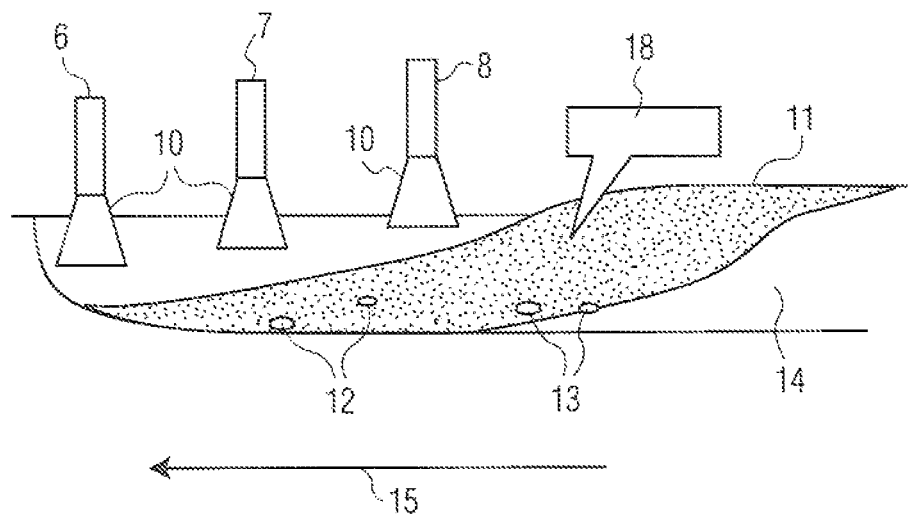
FIG. 4 is a sectional view showing that a disturbed flow in a molten pool formed by three electrodes causes slag inclusions.
Figure 5:
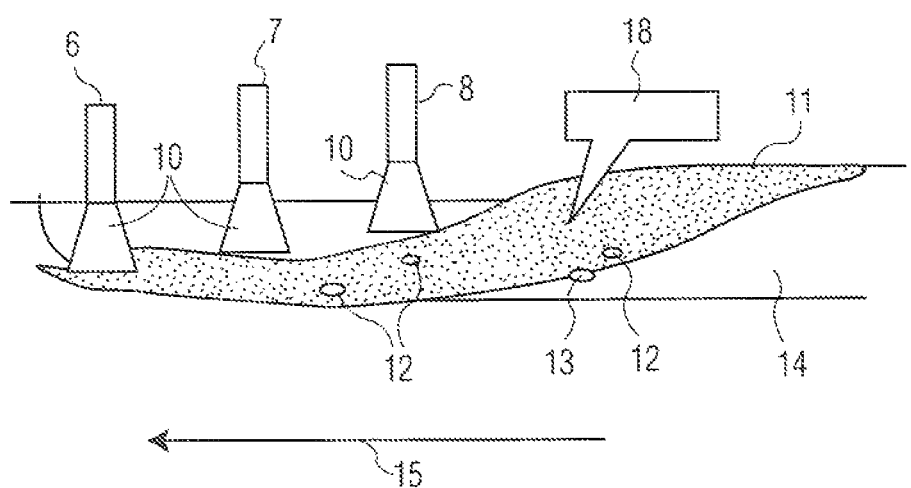
FIG. 5 is a sectional view showing that the depth of fusion of a molten pool formed by three electrodes is decreased by metal pushed from a trailing electrode.
Figure 6:
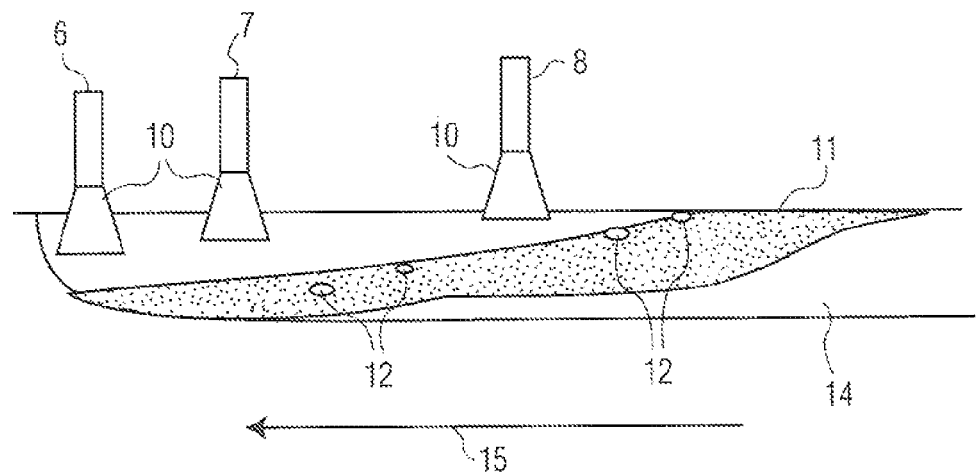
FIG. 6 is a sectional view showing that a semi-one molten pool formed by three electrodes stabilizes a strong flow in the molten pool to avoid slag inclusions and ensure a sufficient depth of fusion during solidification.

After intensive study, we discovered the following:
(1) If the current density is increased to achieve deep penetration, an intensive arc force causes a strong flow of metal in a molten pool formed by multiple electrodes, the disturbed flow contributing to slag inclusions during solidification (see FIG. 4).
(2) If high current and current density are applied to two leading electrodes and a semi-one molten pool, rather than a one-pool, is formed, the strong flow in the molten pool is stabilized so that slag inclusions are avoided during solidification (see FIG. 6).
(3) In addition, even if the depth of fusion is decreased by metal pushed from a trailing electrode when the base material is gouged by arc force (see FIG. 5), a sufficient depth of fusion can be stably ensured by forming a semi-one pool (see FIG. 6).

Figure 7A:
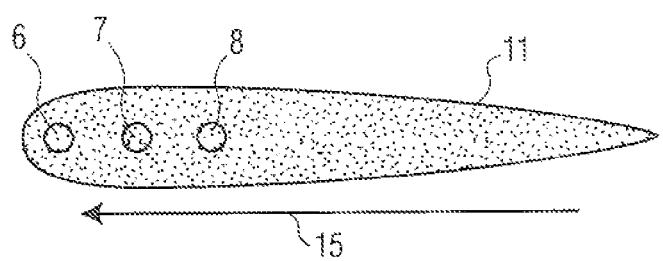
FIGS. 7A and 7B are plan views showing that a molten pool formed by three electrodes is elongated in a weld direction (FIG. 7B) with respect to an example of the conventional art in FIG. 7A to ensure a sufficient time for molten slag to rise.
Figure 7B:
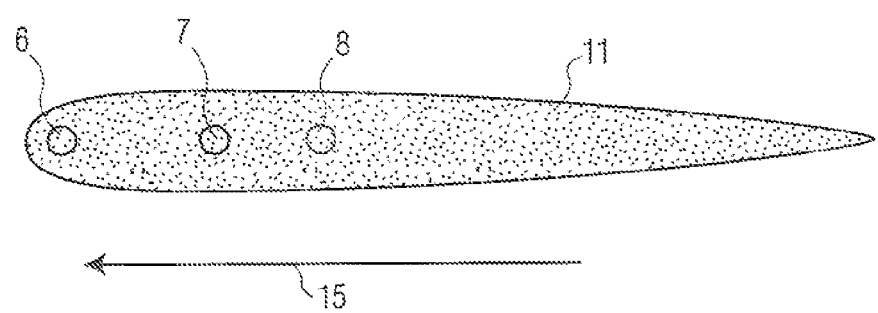

In addition, we studied submerged arc welding with three or more electrodes using a steel plate having a thickness of 25 to 50 mm to find that a sufficient time for molten slag to rise can be ensured by forming a molten pool elongated in the weld direction, as in FIG. 7B, rather than as in FIG. 7A, to inhibit welding defects due to molten slag inclusions.

Our methods are intended for multiple-electrode submerged arc welding with three or more electrodes, and the center-to-center spacings between first to third electrodes 6 and 8 and the currents and current densities of the first electrode 6 and the second electrode 7 are specified, where the first electrode 6 is the leading electrode in a direction of travel in welding, followed by the second electrode 7, the third electrode 8, and a fourth electrode 9.

Welding Power Source

A direct-current power source is used for supplying current to the first electrode 6 in multiple-electrode submerged arc welding with three or more electrodes. The polar character may be either straight polarity or reverse polarity and is not particularly specified.

If a direct-current power source is used for supplying current to the first electrode 6, a sufficient depth of fusion is achieved at low heat input. For the second and subsequent electrodes, alternating-current power sources are preferably used so that arcs 10 do not interfere with each other.

Weld Current

The welding by the first electrode 6 is carried out at a current density of 250 A/mm² or more, and the welding by the second electrode 7 is carried out at a current density of 150 A/mm² or more.

The current densities (=weld current/cross-sectional area of wire) of the first electrode 6 and the second electrode 7 are specified because the penetration by the two electrodes 6 and 7 greatly affects the shape of weld penetration in multiple-electrode submerged arc welding with three or more electrodes.

If the current density of the first electrode 6 falls below 250 A/mm² and the current density of the second electrode 7 falls below 150 A/mm², sufficient penetration in the steel thickness direction cannot be achieved because the density of arc energy is insufficient. A current density of 260 to 310 A/mm² is preferred for the first electrode 6, whereas a current density of 160 to 240 A/mm² is preferred for the second electrode 7. Types of weld wires include solid wires and cored wires.

To carry out welding with deep penetration and a reduced amount of base material molten in the steel width direction, additionally, the current ratio of the first electrode ($I_1$) to the second electrode ($I_2$) is set so as to satisfy inequality (1):

$$I_2/I_1 \geq 0.5 \quad (1)$$

where $I_1$ is the current (A) of the first electrode 6 and $I_2$ is the current (A) of the second electrode 7.

If $I_2/I_1$ falls below 0.5, welding defects such as slag inclusions and hot cracks tend to occur. A ratio of 0.55 to 0.85 is preferred in view of inhibiting defects.

In addition, the wire diameter must be reduced to carry out such high-current-density welding. To achieve the above current density, it is desirable that the wire diameter be 3.2 mm or less, preferably 2.4 mm or less, that the weld current of the first electrode be 1,000 A or more, and that the weld current of the second electrode be 600 A or more. The upper limits, which are appropriately selected depending on the capacity of the wire feeder, are about 1,600 A for the first electrode 6 and about 1,300 A for the second electrode 7.

As the weld current is increased, the wire feeding speed must be increased. This imposes a significant load on the wire feeder, thus making it difficult to stably feed the wires. Accordingly, the upper limit of the weld current is appropriately selected depending on the capacity of the wire feeder of the welding machine used.

Interelectrode Spacing

One of the interelectrode spacings (center-to-center spacings between adjacent wires) is 23 mm or more on the surface of the steel, and the remaining interelectrode spacings are 20 mm or less. For four electrodes, for example, one of the three interelectrode spacings may be 23 mm or more, and the two remaining interelectrode spacings may be 20 mm or less. The 23 mm or more interelectrode spacing may be any of the interelectrode spacings between the first electrode 6 and the second electrode 7, between the second electrode 7 and the third electrode 8, and between the third electrode 8 and the fourth electrode 9.

Because the welding by the leading electrode involves extremely high energy density, the arc pressure is so high that molten metal behind the arc flows aggressively backward and vibrates the molten pool to trap slag and residual material on a surface of a groove, thus causing defects.

Therefore, the molten pool is formed as a semi-one pool, that is, a molten pool partially constricted and shallow at the bottom surface of the molten pool, so that the molten metal flows gently along the bottom surface of the molten pool. A semi-one pool refers to a shape like a bottle gourd, as shown in FIG. 8, formed such that two front and rear molten pools are fused together.

Figure 8:
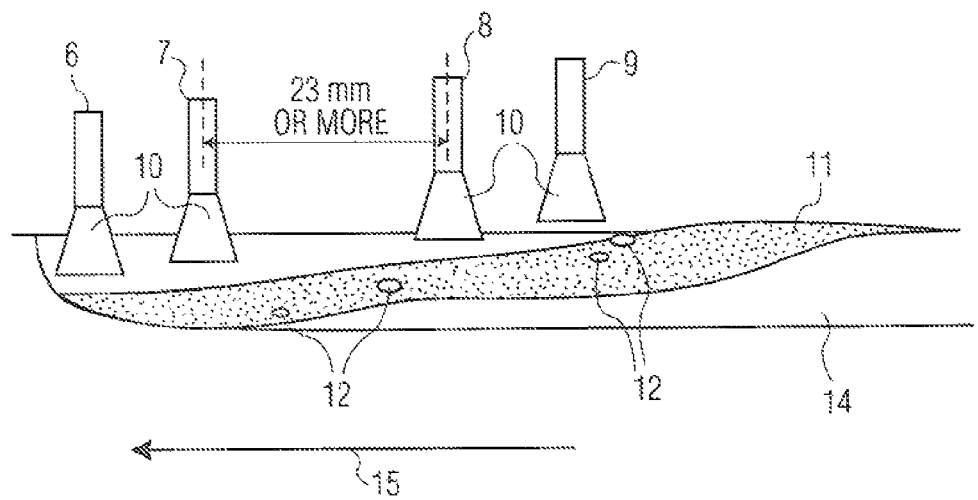
FIG. 8 is a sectional view showing that a semi-one molten pool is formed if one of the interelectrode spacings between four electrodes is 23 mm or more on a surface of steel and the remaining interelectrode spacings are 20 mm or less.

To this end, as shown in FIG. 8, one of the interelectrode spacings between three or more electrodes is 23 mm or more on the surface of the steel, and the remaining interelectrode spacings are 20 mm or less. This allows formation of a semi-one molten pool, thus inhibiting defects while ensuring deep penetration.

Figure 9:
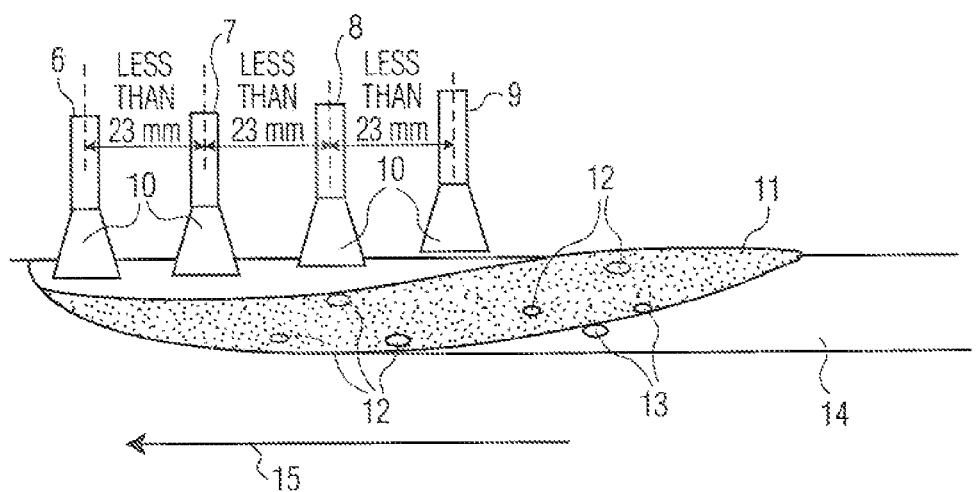
FIG. 9 is a sectional view showing that, if all interelectrode spacings between four electrodes on a surface of steel fall below 23 mm, defects occur and the depth of fusion is decreased because the molten pool has an arc-shaped bottom surface.

As shown in FIG. 9, if all interelectrode spacings fall below 23 mm, defects tend to occur because the molten pool has an arc-shaped bottom surface, and the depth of fusion may also be decreased by a flow of metal from the trailing electrodes.

Figure 10:
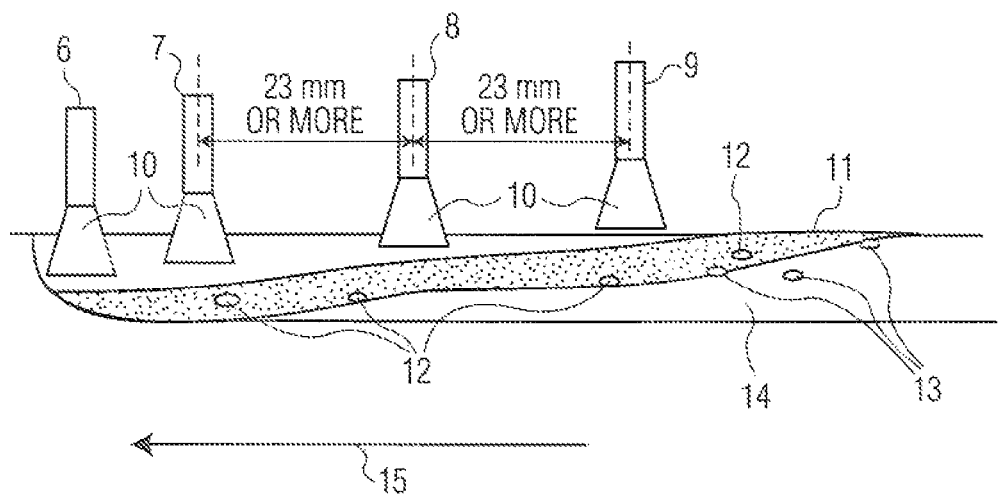
FIG. 10 is a sectional view showing that, if two or more of the interelectrode spacings between four electrodes are 23 mm or more, defects are significantly increased because the molten pool becomes excessively large and the bottom thereof solidifies at an excessive speed.

As shown in FIG. 10, on the other hand, if two or more interelectrode spacings are 23 mm or more, defects are significantly increased because the molten pool becomes excessively large and the bottom of the weld metal solidifies at an excessive speed.

Figure 11:
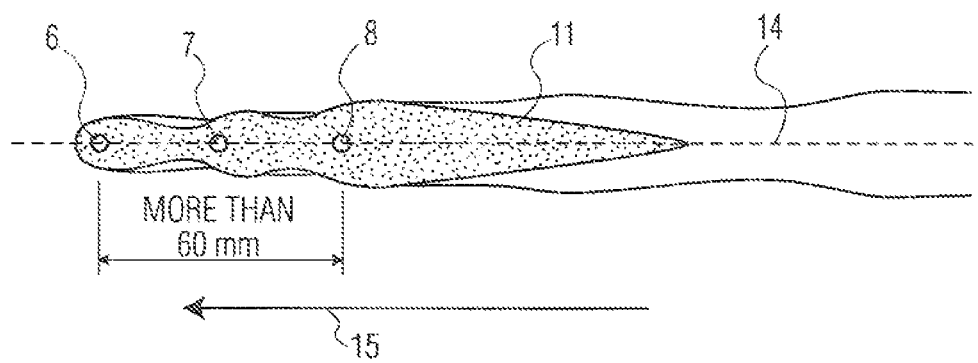
FIG. 11 is a plan view showing that, if the center-to-center spacing between first and third electrodes of three electrodes exceeds 60 mm, a weld bead having an irregular shape is formed because molten pools formed by the individual electrodes are poorly fused.

In addition, if the center-to-center spacing between the first electrode and the third electrode falls below 40 mm, slag inclusions tend to occur because the time for slag to rise is short. On the other hand, the center-to-center spacing is 60 mm or less; if it exceeds 60 mm, as shown in FIG. 11, the bead tends to be irregular because the molten pools formed by the individual electrodes are poorly fused. The interelectrode spacings are values on the surface of the steel.

Figure 12A:
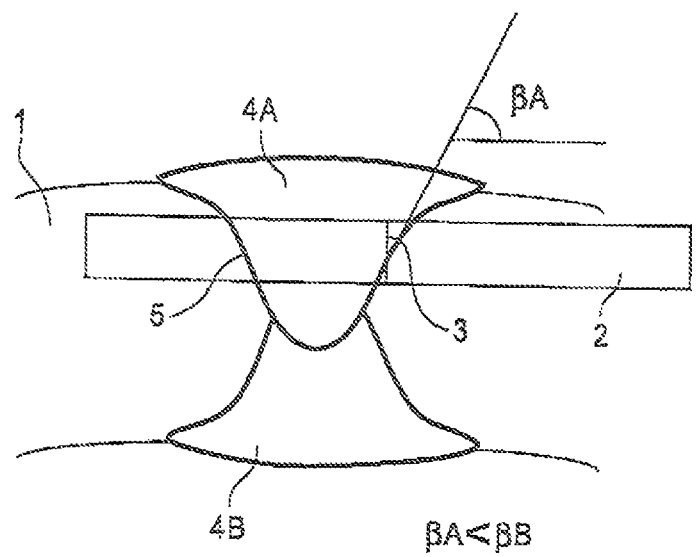
FIGS. 12A and 12B are diagrams showing the cross-sectional shape of a weld formed when the wire center-to-center spacing between third and fourth electrodes of four electrodes is 20 mm or less on a surface of steel (FIG. 12A) and the cross-sectional shape of a weld formed when the wire center-to-center spacing between third and fourth electrodes is less than 20 mm (FIG. 12B).

In addition, as shown in FIG. 12A, if the weld is to be formed in a cross-sectional shape in which the width of penetration is larger on the outer side of the steel plate such that the BOND is inclined (at an angle of inclination of βA, as opposed to βB in FIG. 12B), the wire center-to-center spacing between the third electrode 8 and the fourth electrode 9 is 20 mm or less on the surface of the steel.

Figure 12B:
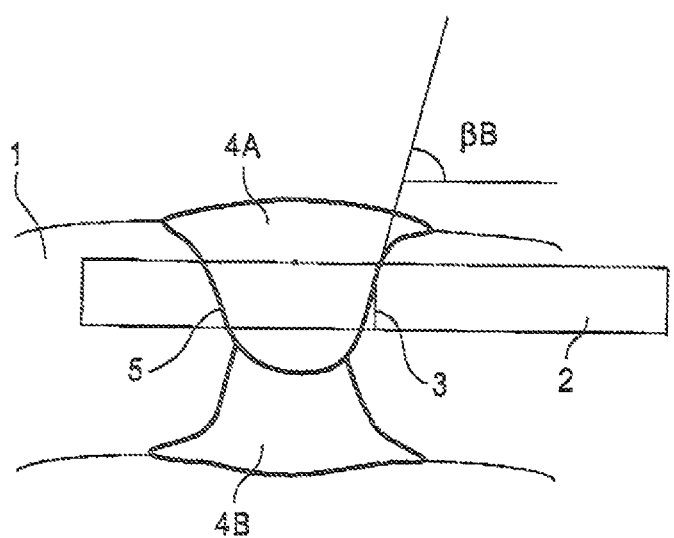

The weld having the cross-sectional shape shown in FIG. 12A has a better toughness than a weld having an upright BOND, as shown in FIG. 12B, according to a Charpy impact test carried out with the notch location lying at the BOND.

Figure 2:
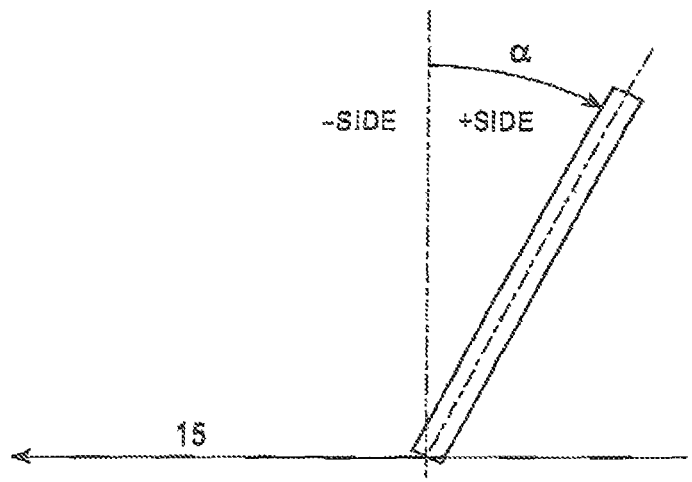
FIG. 2 is a diagram illustrating angles of electrodes.

In addition, as shown in FIG. 2, the angle of the first electrode 6 preferably falls within the range of −10° to +5° (FIG. 2 shows that the angle of electrode is inclined toward the plus side, where the minus side is referred to as a backward angle). Within this range, appropriate penetration can be readily achieved. The angle of the second electrode 7 preferably falls within the range of −5° to +20°. The angle of the third electrode 8 preferably falls within the range of 0° to 35°. The angle of the succeeding electrode is preferably that of the preceding electrode plus 5° to 15°. With such angles of electrodes, a defect-free, high-quality weld can be readily formed.

The welding method is particularly effective, for example, for seam welding of high-strength steel pipes requiring large thickness and high toughness because a bead with low weld heat input and a shape of deep penetration can be formed in the manufacture of pipes and fewer welding defects occur than in the conventional art.

That is, whereas a reduction in weld heat input for higher toughness decreases yield because of increased welding defects and significantly decreases manufacturing efficiency of plates used for steel pipes because steel must be manufactured in low content (for example, in a lower carbon equivalent content), thus decreasing total manufacturing efficiency and increasing manufacturing costs, our methods enable thick-walled large-diameter steel pipes with high strength and high toughness to be easily manufactured.

If our method is used for seam welding (double one-layer welding) of UOE steel pipes, the method is preferably applied to both sides because the advantage of our method (the advantage of allowing deep penetration welding) does not appear clearly if the method is applied to only one of the inner and outer sides.

Additionally, a defect-free weld with a good bead appearance can be formed by multiple-electrode submerged arc welding with three or more electrodes. It is preferable to select specific welding conditions satisfying the characteristics, such as weld toughness, required for customer specifications using specimens and make a database in advance so that the welding conditions can be easily selected in actual production.

Table 8 shows the relationship between wire diameter and current density as an example of a database of welding conditions. If thin wires are used to increase weld current, a welding machine equipped with a feeding motor with appropriate inertia and torque is used so that the wires can be fed at high speed.

EXAMPLE 1

UOE steel pipes were produced by a conventional process using steel plates containing the chemical components and having the mechanical properties shown in Table 1. The shapes of grooves shown in FIG. 1 were used for seam welding, and the dimensions thereof are shown in Table 2.

The seam welding was carried out on the inner and outer sides by three-electrode submerged arc welding and four-electrode submerged arc welding. The inner welding and the outer welding were carried out under the same welding conditions. In Table 3-2, toughness was evaluated by taking a specimen from the outer weld, and welding defects and weld appearance were evaluated on the inner and outer welds.

Tables 3-1 and 3-2 show the welding conditions, the presence or absence of welding defects, the results of visual observation of bead appearance, and overall evaluation in three-electrode submerged arc welding. Tables 4-1 and 4-2 show the welding conditions, the presence or absence of welding defects, the results of visual observation of bead appearance, and overall evaluation in four-electrode submerged arc welding. In the overall evaluation, which is based on the results of the welding defect evaluation and the HAZ toughness evaluation, A is "Excellent" (superior toughness and no welding defects), B is "Good" (good toughness and no welding defects), and C is "Poor" (welding defects occurred).

The presence or absence of welding defects and the penetration condition were examined by X-ray inspection.

Figure 3:
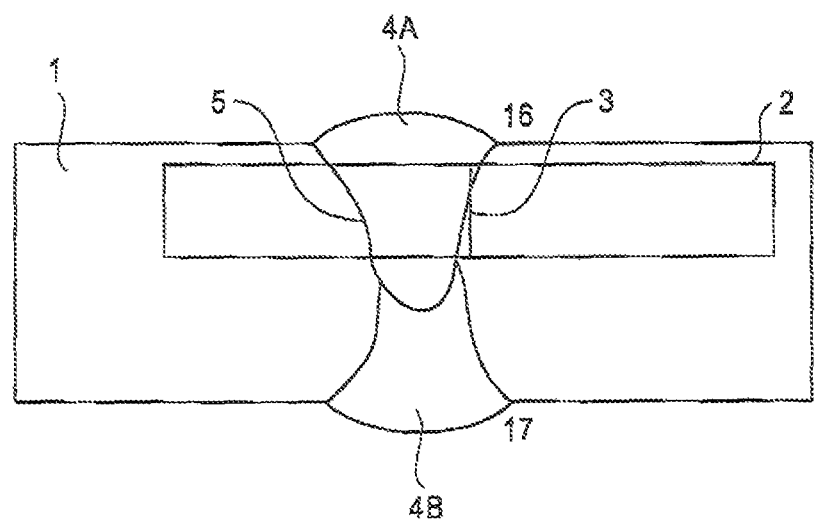
FIG. 3 is a sectional view showing the position where a Charpy impact test specimen is taken.

The angles of electrodes in the tables are illustrated in FIG. 2. FIG. 3 shows the position where a specimen 2 was taken for a Charpy impact test carried out to determine the FL toughness (vTrs) of a UOE steel pipe 1 in the tables, where a notch location 3 lay at a BOND 5 of a weld 4A on the final side (outer side).

According to the results shown in Tables 3-2 and 4-2, good welds without slag inclusions or a lack of penetration were formed in our examples for both three-electrode submerged arc welding and four-electrode submerged arc welding.

In Table 4-2, the weld of symbol 3 was formed wherein the wire center-to-center spacing between the third electrode and the fourth electrode in four-electrode submerged arc welding exceeded 20 mm on the surface of the steel, had an upright BOND and was slightly inferior in toughness, although this weld suffered no welding defects and had a good bead appearance.

In the examples in Table 4-2, particularly, the welds of symbols 1, 2, and 4 to 6 had a better toughness than the weld of symbol 3 according to the Charpy impact test (notch location: BOND; the position where specimens were taken: 2 mm from the surface on the outer side). 0

On the other hand, slag inclusions and a lack of penetration were observed in the comparative examples (symbols 4 to 9 in Table 3-2 and symbols 7 to 13 in Table 4-2) in terms of interelectrode spacings and/or the current densities of the first and second electrodes (6 and 7).

In Table 3-2, particularly, the weld of symbol 5 had a bead with uneven width (hereinafter referred to as being "irregular") because of the large wire center-to-center spacing between the first electrode 6 and the third electrode 8 on the surface of the steel.

EXAMPLE 2

Figure 1:
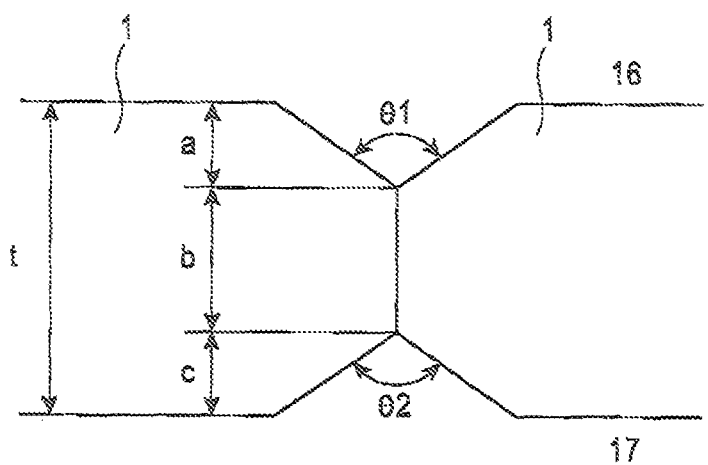
FIG. 1 is a sectional view showing shapes of grooves.

Welded joints were formed by forming welding grooves of the shapes shown in FIG. 1 for seam welding in the manufacture of large-diameter steel pipes and carrying out welding equivalent to seam welding in the manufacture of large-diameter steel pipes in one layer on each of the inner and outer sides by multiple-electrode submerged arc welding. Table 5 shows the dimensions of the grooves.

Tables 6-1 and 6-2 show the welding conditions in the inner welding, and Tables 7-1 and 7-2 show the welding conditions and the results of observation of the welds in the outer welding. In the overall evaluation, which is based on the results of the welding defect evaluation and the HAZ toughness evaluation, A is "Excellent" (superior toughness and no welding defects), B is "Good" (good toughness and no welding defects), and C is "Poor" (welding defects occurred).

The welds formed under inner welding conditions N1 to N3 suffered no welding defects and had a good bead appearance.

The welds of outer welding condition symbols 1 to 4, which are our examples employing four-electrode submerged arc welding, suffered no welding defects and had a good bead appearance. The weld of outer welding condition symbol 5, which is one of our examples employing three-electrode submerged arc welding, suffered no welding defects and had a good bead appearance.

The weld of outer welding condition symbol 6 was formed wherein the wire center-to-center spacing between the third electrode and the fourth electrode in four-electrode submerged arc welding exceeded 20 mm on the surface of the steel, had an upright BOND and was slightly inferior in toughness, although this weld suffered no welding defects and had a good bead appearance.

In the above examples, the welds of outer welding condition symbols 1 to 4 had a better toughness than the weld of outer welding condition symbol 6 according to the Charpy impact test (notch location: BOND; the position where specimens were taken: 2 mm from the surface on the outer side).

On the other hand, the weld of outer welding condition 7 had welding defects, namely, slag inclusions 13, because of the small wire center-to-center spacing between the first electrode 6 and the third electrode 8 on the surface of the steel. The weld of outer welding condition 8 had an irregular bead with uneven width because of the large wire center-to-center spacing between the first electrode 6 and the third electrode 8 on the surface of the steel.

The welds of outer welding conditions 9 and 10 showed a lack of penetration because of the low current density of the first electrode for outer welding condition 9 and because of the low current density of the second electrode for outer welding condition 10.

The weld of outer welding condition 11 had welding defects, namely, slag inclusions, because of the small wire center-to-center spacing between the first electrode 6 and the third electrode 8 on the surface of the steel in three-electrode submerged arc welding. The weld of outer welding condition 12 had an irregular bead because of the large wire center-to-center spacing between the first electrode 6 and the third electrode 8 on the surface of the steel in three-electrode submerged arc welding.

INDUSTRIAL APPLICABILITY

A multiple-electrode submerged arc welding method is provided that allows a reduction in weld heat input while ensuring penetration comparable to a conventional level and also inhibits welding defects, so that it has significant industrial usefulness in manufacturing, with high productivity, high-strength steel pipes of API (American Petroleum Institute) X100 or higher with superior seam weld toughness. This method can also be applied to steel pipes other than API X100 steel pipes.

Additionally, the multiple-electrode submerged arc welding method inhibits welding defects such as molten slag inclusions at low heat input without decreasing welding efficiency, so that it has significant industrial usefulness in manufacturing large-diameter welded steel pipes having sound weld beads with superior weld toughness.

TABLE 1

| Symbol | Pipe thickness mm | Yield strength Mpa | Tensile strength Mpa | Chemical Composition: mass % | | | | | | | | | |
|---|---|---|---|---|---|---|---|---|---|---|---|---|---|
| | | | | C | Si | Mn | P | S | Cu | Ni | Cr | Mo | Nb |
| X | 25 | 510 | 570 | 0.150 | 0.18 | 1.50 | 0.013 | 0.003 | 0.01 | 0.01 | 0.03 | 0.01 | 0.03 |
| Y | 33 | 580 | 685 | 0.050 | 0.10 | 1.45 | 0.005 | 0.002 | 0.10 | 0.20 | 0.02 | 0.00 | 0.02 |
| Z | 40 | 660 | 790 | 0.060 | 0.05 | 1.65 | 0.004 | 0.002 | 0.08 | 0.10 | 0.03 | 0.20 | 0.03 |

TABLE 2

| Symbol | Pipe thickness | a | b | c | θ1 | θ2 |
|---|---|---|---|---|---|---|
| A1 | 25 | 6.5 | 12 | 6.5 | 80 | 80 |
| A2 | 33 | 8.0 | 17 | 8.0 | 85 | 85 |
| A3 | 40 | 9.5 | 21 | 9.5 | 85 | 85 |

TABLE 3-1

| | | | First electrode | | | | Second electrode | | | | Third electrode | | | |
|---|---|---|---|---|---|---|---|---|---|---|---|---|---|---|
| Symbol | Steel plate | Groove | Current A | Voltage V | Power source | Wire diameter mm | Current A | Voltage V | Power source | Wire diameter mm | Current A | Voltage V | Power source | Wire diameter mm |
| 1 | X | A1 | 1000 | 35 | DC | 2.0 | 700 | 36 | AC | 2.4 | 700 | 38 | AC | 4.0 |
| 2 | Y | A2 | 1250 | 35 | DC | 2.4 | 800 | 38 | AC | 2.4 | 650 | 38 | AC | 4.0 |
| 3 | Z | A3 | 1300 | 35 | DC | 2.4 | 950 | 38 | AC | 2.8 | 700 | 38 | AC | 4.0 |
| 4 | X | A1 | 1000 | 35 | DC | 2.0 | 700 | 36 | AC | 4.0 | 700 | 38 | AC | 4.0 |
| 5 | Y | A2 | 1200 | 35 | DC | 2.4 | 800 | 38 | AC | 4.0 | 650 | 38 | AC | 4.0 |
| 6 | Z | A3 | 1200 | 35 | DC | 4.0 | 800 | 38 | AC | 2.4 | 700 | 38 | AC | 4.0 |
| 7 | X | A1 | 1250 | 35 | DC | 2.0 | 700 | 36 | AC | 4.0 | 700 | 38 | AC | 4.0 |
| 8 | Y | A2 | <u>1200</u> | 35 | DC | 3.8 | 800 | 38 | AC | 4.0 | 650 | 38 | AC | 4.0 |
| 9 | Z | A3 | 1350 | 35 | DC | 3.8 | 800 | 38 | AC | 4.0 | 700 | 38 | AC | 4.0 |

| | Angle of electrode | | | Interelectrode spacing (mm) | | | | Welding speed |
|---|---|---|---|---|---|---|---|---|
| Symbol | 1 | 2 | 3 | No. | 1-2 | 2-3 | 1-3 | cm/min |
| 1 | 0 | 15 | 30 | 1 | 15 | 25 | 40 | 150 |
| 2 | 0 | 15 | 30 | 2 | 12 | 32 | 44 | 100 |
| 3 | 0 | 15 | 25 | 3 | 28 | 18 | 46 | 89 |
| 4 | 0 | 15 | 30 | 4* | 15 | 15 | 30 | 155 |
| 5 | 0 | 15 | 30 | 5* | 32 | 35 | 67 | 110 |
| 6 | 0 | 15 | 25 | 6 | 30 | 20 | 50 | 95 |
| 7 | 0 | 15 | 30 | 7 | 28 | 13 | 41 | 145 |
| 8 | 0 | 15 | 30 | 8 | 15 | 32 | 47 | 97 |
| 9 | 0 | 15 | 25 | 9* | 15 | 15 | 30 | 82 |

Underline: beyond the scope of the invention

TABLE 3-2

| Symbol | Steel plate | Groove | Current density of first electrode A/mm2 | Current density of second electrode A/mm2 | Weld heat input kJ/cm | FL toughness vTrs (° C.) | Presence or absence of welding defects and appearance of weld bead | Overall Evaluation | Remarks |
|---|---|---|---|---|---|---|---|---|---|
| 1 | X | A1 | 318 | 155 | 34.7 | −45.0 | Good | A | Invention example |
| 2 | Y | A2 | 276 | 177 | 59.3 | −35.0 | Good | A | Invention example |
| 3 | Z | A3 | 287 | 154 | 72.9 | −44.0 | Good | A | Invention example |
| 4 | X | A1 | 318 | 56 | 33.6 | −50.0 | Slag inclusions | C | Comparative example |
| 5 | Y | A2 | 265 | 64 | 53.0 | −38.0 | Slag inclusions, lack of penetration, and irregular bead | C | Comparative example |
| 6 | Z | A3 | 95 | 177 | 62.5 | −43.0 | Lack of penetration | C | Comparative example |
| 7 | X | A1 | 398 | 56 | 39.5 | −45.0 | Lack of penetration | C | Comparative example |
| 8 | Y | A2 | <u>106</u> | 64 | 60.1 | −50.0 | Lack of penetration | C | Comparative example |
| 9 | Z | A3 | <u>119</u> | 64 | 76.3 | −65.0 | Slag inclusions and lack of penetration | C | Comparative example |

A Excellent
B Good
C Poor

TABLE 4-1

| | | | First electrode | | | | Second electrode | | | |
|---|---|---|---|---|---|---|---|---|---|---|
| Symbol | Steel plate | Groove | Current A | Voltage V | Power source | Wire diameter mm | Current A | Voltage V | Power source | Wire diameter mm |
| 1 | X | A1 | 1150 | 35 | DC | 2.0 | 850 | 35 | AC | 2.0 |
| 2 | Y | A2 | 1200 | 35 | DC | 2.4 | 900 | 35 | AC | 2.4 |
| 3 | Z | A3 | 1250 | 35 | DC | 2.4 | 900 | 35 | AC | 2.6 |
| 4 | Z | A3 | 1250 | 35 | DC | 2.4 | 900 | 35 | AC | 2.6 |
| 5 | X | A1 | 1200 | 35 | DC | 2.0 | 850 | 35 | AC | 2.4 |
| 6 | Y | A2 | 1300 | 35 | DC | 2.4 | 800 | 35 | AC | 2.4 |
| 7 | Z | A3 | 1200 | 35 | DC | 2.0 | 800 | 35 | AC | 2.4 |
| 8 | X | A1 | 1200 | 35 | DC | 2.0 | 850 | 35 | AC | 2.4 |
| 9 | Y | A2 | <u>1200</u> | 35 | DC | 3.8 | 800 | 35 | AC | 2.4 |
| 10 | Z | A3 | 1200 | 35 | DC | 2.0 | 800 | 35 | AC | 4.0 |
| 11 | X | A1 | 1200 | 35 | DC | 2.0 | 850 | 35 | AC | 3.8 |
| 12 | Y | A2 | <u>1200</u> | 35 | DC | 4.0 | 900 | 35 | AC | 3.8 |
| 13 | Z | A3 | 1200 | 35 | DC | 4.0 | 800 | 35 | AC | 2.4 |

TABLE 4-1-continued

| | Third electrode | | | | Fourth electrode | | | |
|---|---|---|---|---|---|---|---|---|
| Symbol | Current A | Voltage V | Power source | Wire diameter mm | Current A | Voltage V | Power source | Wire diameter mm |
| 1 | 700 | 38 | AC | 4.0 | 500 | 38 | AC | 4.0 |
| 2 | 700 | 38 | AC | 4.0 | 500 | 38 | AC | 4.0 |
| 3 | 700 | 38 | AC | 4.0 | 500 | 38 | AC | 4.0 |
| 4 | 700 | 38 | AC | 4.0 | 500 | 38 | AC | 4.0 |
| 5 | 700 | 38 | AC | 4.0 | 500 | 38 | AC | 4.0 |
| 6 | 700 | 38 | AC | 4.0 | 500 | 38 | AC | 4.0 |
| 7 | 700 | 38 | AC | 4.0 | 500 | 38 | AC | 4.0 |
| 8 | 700 | 38 | AC | 4.0 | 500 | 38 | AC | 4.0 |
| 9 | 700 | 38 | AC | 4.0 | 500 | 38 | AC | 4.0 |
| 10 | 700 | 38 | AC | 4.0 | 500 | 38 | AC | 4.0 |
| 11 | 700 | 38 | AC | 4.0 | 500 | 38 | AC | 4.0 |
| 12 | 700 | 38 | AC | 4.0 | 500 | 38 | AC | 4.0 |
| 13 | 700 | 38 | AC | 4.0 | 500 | 38 | AC | 4.0 |

TABLE 4-2

| Symbol | Angle of electrode | | | | Interelectrode spacing (mm) | | | | Welding speed cm/min | Current density of first electrode A/mm2 | Current density of second electrode A/mm2 | Weld heat Input kJ/cm | FL toughness vTrs (° C.) | Presence or absence of welding defects and appearance of weld bead | Overall Evaluation | Remarks |
|---|---|---|---|---|---|---|---|---|---|---|---|---|---|---|---|---|
| | 1 | 2 | 3 | 4 | 1-2 | 2-3 | 3-4 | 1-3 | | | | | | | | |
| 1 | 0 | 15 | 30 | 30 | 30 | 15 | 15 | 45 | 155 | 366 | 271 | 44.7 | −55.0 | Good | A | Invention example |
| 2 | 0 | 15 | 30 | 30 | 15 | 35 | 15 | 50 | 120 | 265 | 199 | 59.6 | −54.0 | Good | A | Invention example |
| 3 | 0 | 15 | 30 | 35 | 15 | 15 | 28 | 30 | 100 | 276 | 170 | 72.5 | −45.0 | Good | B | Invention example |
| 4 | 0 | 15 | 30 | 35 | 28 | 15 | 15 | 43 | 100 | 276 | 170 | 72.5 | −60.0 | Good | A | Invention example |
| 5 | 0 | 15 | 25 | 35 | 27 | 15 | 15 | 42 | 165 | 382 | 188 | 42.7 | −47.0 | Good | A | Invention example |
| 6 | 0 | 15 | 25 | 35 | 18 | 42 | 18 | 60 | 130 | 287 | 177 | 55.0 | −40.0 | Good | A | Invention example |
| 7 | 0 | 15 | 25 | 30 | 15 | 15 | 15 | 30 | 98 | 382 | 177 | 70.8 | −45.0 | Slag inclusions | C | Comparative example |
| 8 | 0 | 15 | 30 | 35 | 30 | 28 | 28 | 58 | 170 | 382 | 188 | 41.4 | −40.0 | Slag inclusions | C | Comparative example |
| 9 | 0 | 15 | 30 | 35 | 15 | 35 | 15 | 50 | 150 | 106 | 177 | 46.2 | −38.0 | Lack of penetration | C | Comparative example |
| 10 | 0 | 15 | 30 | 35 | 40 | 15 | 15 | 55 | 110 | 382 | 64 | 63.1 | −48.0 | Lack of penetration | C | Comparative example |
| 11 | 0 | 15 | 30 | 30 | 35 | 15 | 35 | 50 | 195 | 382 | 75 | 36.1 | −41.0 | Slag inclusions and lack of penetration | C | Comparative example |
| 12 | 0 | 15 | 30 | 30 | 15 | 15 | 38 | 30 | 146 | 95 | 79 | 48.9 | −37.0 | Lack of penetration | C | Comparative example |
| 13 | 0 | 15 | 30 | 30 | 35 | 27 | 30 | 62 | 100 | 95 | 177 | 69.4 | −33.0 | Slag inclusions and lack of penetration | C | Comparative example |

A Excellent
B Good
C Poor

TABLE 5

| Symbol | Thickness mm | a mm | b mm | c mm | θ1 deg | θ2 deg |
|---|---|---|---|---|---|---|
| A1 | 26 | 5.9 | 10.7 | 9.4 | 90 | 65 |
| A2 | 38 | 8.6 | 15.6 | 13.8 | 90 | 65 |
| A3 | 50 | 11.3 | 20.5 | 18.2 | 65 | 59 |

TABLE 6-1

| | | First electrode | | | Second electrode | | | Third electrode | | |
|---|---|---|---|---|---|---|---|---|---|---|
| Condition | Groove | Current A | Voltage V | Wire diameter mm | Current A | Voltage V | Wire diameter mm | Current A | Voltage V | Wire diameter mm |
| N1 | A1 | 1200 | 38 | 2.4 | 800 | 47 | 2.4 | 800 | 50 | 3.2 |
| N2 | A2 | 1200 | 38 | 2.4 | 800 | 47 | 2.4 | 800 | 50 | 3.2 |
| N3 | A3 | 1200 | 38 | 2.4 | 800 | 47 | 2.4 | 800 | 50 | 3.2 |

TABLE 6-1-continued

| | Fourth electrode | | | Welding speed cm/min | Current density A/mm² | | Heat input kJ/mm |
| | Current A | Voltage V | Wire diameter mm | | | | |
| Condition | | | | | First electrode | Second electrode | |
|---|---|---|---|---|---|---|---|
| N1 | 500 | 45 | 3.2 | 220 | 265 | 177 | 4.0 |
| N2 | 500 | 45 | 3.2 | 110 | 265 | 177 | 7.9 |
| N3 | 500 | 45 | 3.2 | 80 | 265 | 177 | 10.9 |

TABLE 6-2

| | Interelectrode spacing mm | | | | Current density A/mm² | |
| Condition | 1-2 | 2-3 | 3-4 | 1-3 | First electrode | Second electrode |
|---|---|---|---|---|---|---|
| N1 | 25 | 18 | 18 | 43 | 265 | 177 |
| N2 | 20 | 25 | 18 | 45 | 265 | 177 |
| N3 | 24 | 20 | 20 | 44 | 265 | 177 |

TABLE 7-1

| Symbol | Inner side | First electrode | | | Second electrode | | | Third electrode | | |
| | | Current A | Voltage V | Wire diameter mm | Current A | Voltage V | Wire diameter mm | Current A | Voltage V | Wire diameter mm |
|---|---|---|---|---|---|---|---|---|---|---|
| 1 | N1 | 1200 | 38 | 2.4 | 700 | 47 | 2.4 | 600 | 50 | 3.2 |
| 2 | N2 | 1200 | 38 | 2.4 | 700 | 47 | 2.4 | 600 | 50 | 3.2 |
| 3 | N2 | 1200 | 38 | 2.4 | 700 | 47 | 2.4 | 600 | 50 | 3.2 |
| 4 | N3 | 1200 | 38 | 2.4 | 700 | 47 | 2.4 | 600 | 50 | 3.2 |
| 5 | N2 | 1200 | 38 | 2.4 | 700 | 47 | 2.4 | 600 | 50 | 3.2 |
| 6 | N2 | 1200 | 38 | 2.4 | 700 | 47 | 2.4 | 600 | 50 | 3.2 |
| 7 | N2 | 1200 | 38 | 2.4 | 700 | 47 | 2.4 | 600 | 50 | 3.2 |
| 8 | N2 | 1200 | 38 | 2.4 | 700 | 47 | 2.4 | 600 | 50 | 3.2 |
| 9 | N2 | 1100 | 38 | 2.4 | 700 | 47 | 2.4 | 600 | 50 | 3.2 |
| 10 | N2 | 1200 | 38 | 2.4 | 650 | 47 | 2.4 | 600 | 50 | 3.2 |
| 11 | N2 | 1200 | 38 | 2.4 | 700 | 47 | 2.4 | 600 | 50 | 3.2 |
| 12 | N2 | 1200 | 38 | 2.4 | 700 | 47 | 2.4 | 600 | 50 | 3.2 |

| Symbol | Fourth electrode | | | Welding speed cm/min | Current density A/mm² | | Heat input kJ/mm |
| | Current A | Voltage V | Wire diameter mm | | First electrode | Second electrode | |
|---|---|---|---|---|---|---|---|
| 1 | 500 | 45 | 3.2 | 170 | 265 | 155 | 4.6 |
| 2 | 500 | 45 | 3.2 | 80 | 265 | 155 | 9.8 |
| 3 | 500 | 45 | 3.2 | 80 | 265 | 155 | 9.8 |
| 4 | 500 | 45 | 3.2 | 50 | 265 | 155 | 15.7 |
| 5 | | | | 67 | 265 | 155 | 9.7 |
| 6 | 500 | 45 | 3.2 | 80 | 265 | 155 | 9.8 |
| 7 | 500 | 45 | 3.2 | 80 | 265 | 155 | 9.8 |
| 8 | 500 | 45 | 3.2 | 80 | 265 | 155 | 9.8 |
| 9 | 500 | 45 | 3.2 | 80 | 243 | 155 | 9.5 |
| 10 | 500 | 45 | 3.2 | 80 | 265 | 144 | 9.6 |
| 11 | | | | 67 | 265 | 155 | 9.7 |
| 12 | | | | 67 | 265 | 155 | 9.7 |

TABLE 7-2

| Symbol | Interelectrode spacing mm | | | | Current density A/mm² | | FL toughness vTrs (°C.) | Defects and appearance | Overall Evaluation | Remarks |
|---|---|---|---|---|---|---|---|---|---|---|
| | 1-2 | 2-3 | 3-4 | 1-3 | First electrode | Second electrode | | | | |
| 1 | 25 | 18 | 18 | 43 | 265 | 155 | −66 | Good | A | Invention example |
| 2 | 20 | 25 | 15 | 45 | 265 | 155 | −53 | Good | A | Invention example |
| 3 | 35 | 20 | 20 | 55 | 265 | 155 | −55 | Good | A | Invention example |
| 4 | 19 | 30 | 18 | 49 | 265 | 155 | −48 | Good | A | Invention example |
| 5 | 30 | 20 | | 50 | 265 | 155 | −49 | Good | A | Invention example |
| 6 | 20 | 20 | 25 | 40 | 265 | 155 | −34 | Good | B | Invention example |
| 7 | 20 | 15 | 15 | 35* | 265 | 155 | −47 | Slag inclusions | C | Comparative example |
| 8 | 40 | 25 | 20 | 65* | 265 | 155 | −45 | Irregular bead | C | Comparative example |
| 9 | 25 | 20 | 15 | 40 | 243* | 155 | −51 | Lack of penetration | C | Comparative example |
| 10 | 25 | 20 | 15 | 40 | 265 | 144* | −55 | Lack of penetration | C | Comparative example |
| 11 | 20 | 15 | | 35* | 265 | 155 | −52 | Slag inclusions | C | Comparative example |
| 12 | 40 | 25 | | 65* | 265 | 155 | −53 | Irregular bead | C | Comparative example |

Note:
*indicates that the value is beyond the scope of the invention
A Excellent
B Good
C Poor

TABLE 8

| Current (A) | Wire diameter (mm) | | |
|---|---|---|---|
| | ϕ1.6 | ϕ2.4 | ϕ3.2 |
| 400 | 199 | 88 | 50 |
| 500 | 249 | 111 | 62 |
| 600 | 298 | 133 | 75 |
| 700 | 348 | 155 | 87 |
| 800 | 398 | 177 | 99 |
| 900 | 448 | 199 | 112 |
| 1000 | 497 | 221 | 124 |
| 1100 | 547 | 243 | 137 |
| 1200 | 597 | 265 | 149 |
| 1300 | 647 | 287 | 162 |
| 1400 | 696 | 309 | 174 |

The invention claimed is:

1. A multiple-electrode submerged arc welding method for steel, comprising:
spacing one of the interelectrode distances to 23 mm or more on a surface of the steel;
spacing the remaining interelectrode distances to 20 mm or less on the surface of the steel;
supplying current to a first electrode using a direct current power source;
supplying current in which the current density of the first electrode is 250 A/mm² or more and the current density of a second electrode is 150 A/mm² or more;
subjecting steel to multiple-electrode submerged arc welding with three or more electrodes; and
forming a semi-one molten pool that is a molten pool partially constricted and shallow at a bottom surface of the molten pool and has a shape like a bottle gourd such that two front and rear molten pools are fused together.

2. The method according to claim 1, wherein current of the first electrode is 1,000 A or more and current of the second electrode is 600 A or more.

3. The method according to claim 1, wherein welding by the first electrode is carried out with a wire diameter of 3.2 mm or less.

4. The method according to claim 1, wherein the wire center-to-center spacing between the first electrode and the third electrode is 40 to 60 mm on a surface of the steel, and a current ratio of the first electrode ($I_1$) to the second electrode ($I_2$) satisfies the following inequality:

$$I_2/I_1 \geq 0.5$$

where $I_1$ is current (A) of the first electrode and $I_2$ is current (A) of the second electrode.

5. The method according to claim 1, wherein four electrodes are used and the wire center-to-center spacing between the third electrode and the fourth electrode is 20 mm or less on a surface of the steel.

6. The method according to claim 1, wherein each of inner and outer surfaces of the steel is subjected to one-layer welding.

7. The method according to claim 2, wherein welding by the first electrode is carried out with a wire diameter of 3.2 mm or less.

8. The method according to claim 2, wherein the wire center-to-center spacing between the first electrode and the third electrode is 40 to 60 mm on a surface of the steel, and a current ratio of the first electrode ($I_1$) to the second electrode ($I_2$) satisfies the following inequality:

$$I_2/I_1 \geq 0.5$$

where $I_1$ is current (A) of the first electrode and $I_2$ is current (A) of the second electrode.

9. The method according to claim 3, wherein the wire center-to-center spacing between the first electrode and the third electrode is 40 to 60 mm on a surface of the steel, and a current ratio of the first electrode ($I_1$) to the second electrode ($I_2$) satisfies the following inequality:

$$I_2/I_1 \geq 0.5$$

where $I_1$ is current (A) of the first electrode and $I_2$ is current (A) of the second electrode.

10. The method according to claim 7, wherein the wire center-to-center spacing between the first electrode and the third electrode is 40 to 60 mm on a surface of the steel, and a current ratio of the first electrode ($I_1$) to the second electrode ($I_2$) satisfies the following inequality:

$$I_2/I_1 \geq 0.5$$

where $I_1$ is current (A) of the first electrode and $I_2$ is current (A) of the second electrode.

11. The method according to claim 2, wherein four electrodes are used and the wire center-to-center spacing between the third electrode and the fourth electrode is 20 mm or less on a surface of the steel.

12. The method according to claim 3, wherein four electrodes are used and the wire center-to-center spacing between the third electrode and the fourth electrode is 20 mm or less on a surface of the steel.

13. The method according to claim 4, wherein four electrodes are used and the wire center-to-center spacing between the third electrode and the fourth electrode is 20 mm or less on a surface of the steel.

14. The method according to claim 7, wherein four electrodes are used and the wire center-to-center spacing between the third electrode and the fourth electrode is 20 mm or less on a surface of the steel.

15. The method according to claim 10, wherein four electrodes are used and the wire center-to-center spacing between the third electrode and the fourth electrode is 20 mm or less on a surface of the steel.

* * * * *